United States Patent
Ratadiya et al.

(10) Patent No.: US 10,384,548 B2
(45) Date of Patent: Aug. 20, 2019

(54) SYSTEMS AND METHODS FOR A VEHICLE INVERTER CONNECTION BUS

(71) Applicant: General Electric Company, Schenectady, NY (US)

(72) Inventors: Sarit Ratadiya, Bangalore (IN); Ajith Kuttannair Kumar, Erie, PA (US); Tharunendra Sekhar, Bangalore (IN); Mark Allen Murphy, Erie, PA (US); Jacob Alan Hubbell, Erie, PA (US); Kevin Ruybal, Erie, PA (US); Emil Nikolaev Nikolov, Erie, PA (US)

(73) Assignee: GE GLOBAL SOURCING LLC, Norwalk, CT (US)

( * ) Notice: Subject to any disclaimer, the term of this patent is extended or adjusted under 35 U.S.C. 154(b) by 764 days.

(21) Appl. No.: 15/140,812

(22) Filed: Apr. 28, 2016

(65) Prior Publication Data

US 2017/0313196 A1    Nov. 2, 2017

(51) Int. Cl.

| | |
|---|---|
| *H02K 11/00* | (2016.01) |
| *B60L 11/18* | (2006.01) |
| *H02J 1/00* | (2006.01) |
| *B60L 1/00* | (2006.01) |
| *B60L 50/51* | (2019.01) |
| *H02J 5/00* | (2016.01) |

(52) U.S. Cl.
CPC ............ *B60L 11/1803* (2013.01); *B60L 1/00* (2013.01); *B60L 50/51* (2019.02); *H02J 1/00* (2013.01); *B60L 2200/28* (2013.01); *H02J 5/00* (2013.01)

(58) Field of Classification Search
CPC .... H02K 2203/09; H02K 5/225; H02K 11/33; H02K 2203/03; H02K 15/0062; H02K 2211/03
USPC ........................................ 310/68 R, 68 D, 71
See application file for complete search history.

(56) References Cited

U.S. PATENT DOCUMENTS

| | | | | |
|---|---|---|---|---|
| 6,160,696 | A * | 12/2000 | Bailey ................... | H02M 7/003 361/100 |
| 7,989,997 | B2 * | 8/2011 | Hashimoto .......... | B62D 5/0406 310/68 D |
| 8,159,100 | B2 * | 4/2012 | Tanaka .................. | F04B 39/121 310/68 R |
| 8,698,364 | B2 * | 4/2014 | Saito ..................... | F04B 39/121 310/71 |
| 8,897,014 | B2 | 11/2014 | Wagoner et al. | |

(Continued)

*Primary Examiner* — Thanh Lam
(74) *Attorney, Agent, or Firm* — Christopher R. Carroll; The Small Patent Law Group LLC

(57) ABSTRACT

A bus assembly is provided having a bus bar with first and second conductive layers extending along an insulator sheet interposed between the first and second conductive layers. The first and second conductive layers are partially aligned with respect to each other to form a first overlap region of the insulator sheet. The bus assembly includes a first set of arms having a set of diodes and a second set of arms having a set of switches. The bust bar includes a plurality of bus links coupling the plurality of arms to the bus bar forming a plurality of inverters. Each of bus links include a respective first bracket and a respective second bracket aligned with each other forming a second overlap region of the insulator sheet. The first bracket is electrically coupled to the first conductive layer and the second bracket is electrically coupled to the second conductive layer.

22 Claims, 6 Drawing Sheets

(56) References Cited

U.S. PATENT DOCUMENTS 9,065,322 B2 * 6/2015 Ito .......................... H02K 5/225
2013/0313906 A1 11/2013 Gupta et al.

* cited by examiner

SYSTEMS AND METHODS FOR A VEHICLE INVERTER CONNECTION BUS

FIELD

Embodiments of the subject matter disclosed herein relate to circuitry of powered systems.

BACKGROUND

Some vehicles may employ electric traction motors for driving wheels of the vehicles. In some of these vehicles, an electric drive system may output an alternating current (AC) power signal, whereby the traction motors are controlled by varying the frequency and the voltage of AC electric power supplied to the field windings of the traction motors. Commonly, generated electricity powers a rectifier to generate a direct current (DC) link voltage, which is connected to multiple inverters and switches of the electric drive system, for conversion into the AC power signal.

Conventionally, the multiple inverters are connected to a DC bus using bus bars. The bus bars create stray inductances between the inverters, which generate circulating currents. The circulating currents can cause component stresses of the electric drive system. For example, the circulating current generates more heat within the electric drive system leading to a higher operating temperature, which can reduce the operating life of the components. The circulating currents can also create voltage ripples, which can cause problems with controlling the inverters.

BRIEF DESCRIPTION

In an embodiment, a bus assembly includes a bus bar having first and second conductive layers extending along an insulator sheet interposed between the first and second conductive layers. The first and second conductive layers are at least partially aligned with respect to each other to form a first overlap region of the insulator sheet. The bus assembly includes a plurality of arms. A first set of the arms include a set of diodes and a second set of the arms include a set of switches. The bus assembly further includes a plurality of bus links that couple the plurality of arms to the bus bar forming a plurality of inverters. Each of the plurality of bus links include a respective first bracket and a respective second bracket aligned with each other to form a second overlap region of the insulator sheet. The first bracket is electrically coupled to the first conductive layer and the second bracket is electrically coupled to the second conductive layer. The second overlap region is within the first overlap region.

In an embodiment, a bus assembly includes a bus bar having first and second conductive layers extending along an insulator sheet interposed between the first and second conductive layers. The first and second conductive layers are at least partially aligned with respect to each other to form a first overlap region of the insulator sheet. The bus assembly includes a set of diodes electrically coupled to the first and second conductive layers, plural sets of switches electrically coupled to the first and second conductive layers in parallel to the set of diodes, and plural sets of capacitors coupled to the sets of switches. Each set of the sets of capacitors respectively includes at least three capacitors mounted on a single unitary body.

In an embodiment, a method (e.g., for forming a bus of an electric drive subsystem) includes coupling a first conductive layer and a second conductive layer to opposing sides of an insulator sheet. The first and second conductive layers are at least partially aligned with respect to each other relative to the insulator sheet to form a first overlap region of the insulator sheet. The method further includes fastening a first bracket of a bus link to the first conductive layer and a second bracket of the bus link to the second conductive layer. The first bracket and the second bracket are aligned with each other to form a second overlap region of the insulator sheet. The second overlap region is within the first overlap region. The method further includes electrically coupling a phase module and a capacitor bus to the bus link, wherein the capacitor bus has a single unitary body and includes at least three capacitors.

In an embodiment, a system (e.g., a vehicle drive system) includes a DC electrical power source having first and second polarities (e.g., positive and negative, or positive and ground, or negative and ground), a controller, at least one traction motor; and a bus assembly. The bus assembly includes a DC link bus bar having first and second conductive layers extending along an insulator sheet interposed between the first and second conductive layers. The first and second conductive layers are at least partially aligned with respect to each other to form a first overlap region of the insulator sheet, and the first and second conductor layers are respectively electrically coupled to the first and second polarities of the DC electrical power source. The bus assembly includes a plurality of arms. The arms include laminated bus bars, plural diodes electrically connected to one or more of the laminated bus bars, and one or more sets of switches electrically connected to one or more of the laminated bus bars. The bus assembly further includes a plurality of bus links that couple the plurality of arms to the DC link bus bar forming a plurality of inverters. Each of the plurality of bus links include a respective first bracket and a respective second bracket aligned with each other to form a second overlap region of the insulator sheet. The first bracket is electrically coupled to the first conductive layer and the second bracket is electrically coupled to the second conductive layer. The second overlap region is within the first overlap region. The controller is configured to control the switches for the inverters to electrically power the at least one traction motor for movement of the vehicle along a route.

BRIEF DESCRIPTION OF THE DRAWINGS

The present inventive subject matter will be better understood from reading the following description of non-limiting embodiments, with reference to the attached drawings, in which.

DETAILED DESCRIPTION

Figure 1:
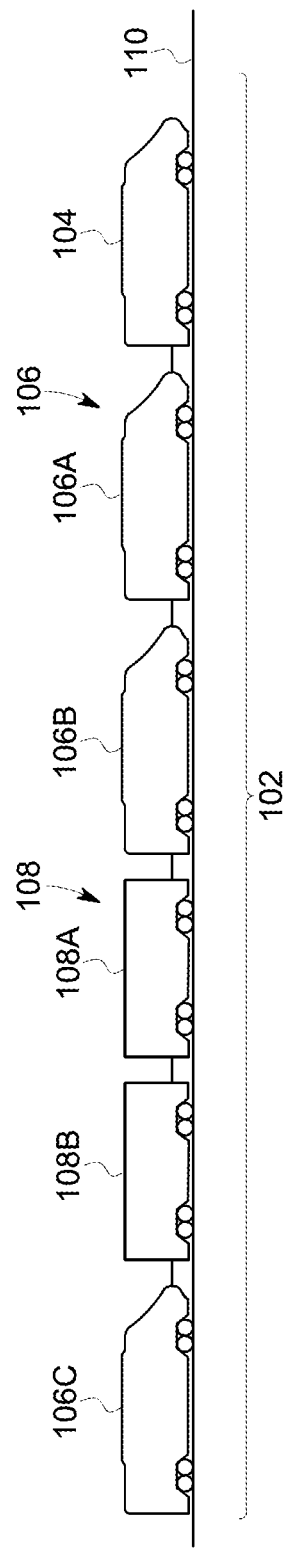
FIG. 1 illustrates a vehicle system, in accordance with an embodiment.

One or more embodiments provided herein relate to systems and methods for a connection bus for multiple inverters included in an electric drive subsystem of a vehicle system. The electric drive subsystem may be an alternating current (AC) drive system that supplies power to one or more rectifiers, which generate a direct current (DC) link voltage. The DC link voltage is connected to multiple inverters along a DC bus having bus links and bus bars. According to one aspect, the bus bars are formed by two conductive layers corresponding to polarities of the DC voltage. One of the conductive layers may correspond to a positive voltage potential (DC+) and the second conductive layers may be a ground or negative voltage potential (DC−). An insulator, such as glastic, is interposed between the two conductive layers, which at least partially overlap each other. In one aspect, the bus includes a capacitor bus bar coupled to an inverter phase module. The capacitor bus bar may include a plurality of capacitors (e.g., three). The overlap area formed by the two conductive layers and a thickness of the insulator are configured to reduce a stray inductance generated by the bus bar. Thereby, the bus connection described herein reduces circulating currents, which damage and/or cause component stress of the electric drive subsystem. Additionally, the reduced inductances increases the resonance frequency and damping factor of the electric drive subsystem.

At least one technical effect of various embodiments described herein may include reducing a circulating current between inverters on a DC bus. At least one technical effect of various embodiments described herein may include increasing performance and an operational life span of components of an electric drive subsystem. At least one technical effect of various embodiments described herein may decreasing a packaging complexity and manufacturing cost of an electric drive subsystem.

The foregoing brief description, as well as the following detailed description of certain embodiments of the inventive subject matter, will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present inventive subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

FIG. 1 illustrates one embodiment of a vehicle system 102, in accordance with an embodiment. The illustrated vehicle system 102 includes propulsion-generating vehicles 104, 106 (e.g., vehicles 104, 106A, 106B, 106C) and non-propulsion-generating vehicles 108 (e.g., vehicles 108A, 108B) that travel together along a route 110. Although the vehicles 104, 106, 108 are shown as being mechanically coupled with each other, optionally, the vehicles 104, 106, 108 may not be mechanically coupled with each other.

The propulsion-generating vehicles 104, 106 are shown as locomotives, the non-propulsion-generating vehicles 108 are shown as rail cars, and the vehicle system 102 is shown as a train in the illustrated embodiment. Alternatively, the vehicles 104, 106 may represent other vehicles, such as automobiles, marine vessels, and/or the like, and the vehicle system 102 can represent a grouping or coupling of these other vehicles. The number and arrangement of the vehicles 104, 106, 108 in the vehicle system 102 are provided as one example and are not intended as limitations on all embodiments of the subject matter described herein. It may be noted that the vehicle may or may not be mechanically coupled with each other.

Optionally, groups of one or more adjacent or neighboring propulsion-generating vehicles 104 and/or 106 may be referred to as a vehicle consist. For example the vehicles 104, 106A, 106B may be referred to as a first vehicle consist of the vehicle system 102 and the vehicle 106C referred to as a second vehicle consist of the vehicle system 102. Alternatively, the vehicle consists may be defined as the vehicles that are adjacent or neighboring to each other, such as a vehicle consist defined by the vehicles 104, 106A, 106B, 108A, 108B, 106C.

The propulsion-generating vehicles 104, 106 may be arranged in a distributed power (DP) arrangement. For example, the propulsion-generating vehicles 104, 106 can include a lead vehicle 104 that issues command messages to the other propulsion-generating vehicles 106A, 106B, 106C which are referred to herein as remote vehicles. The designations "lead" and "remote" are not intended to denote spatial locations of the propulsion-generating vehicles 104, 106 in the vehicle system 102, but instead are used to indicate which propulsion-generating vehicle 104, 106 is communicating (e.g., transmitting, broadcasting, or a combination of transmitting and broadcasting) command messages and which propulsion-generating vehicles 104, 106 are being remotely controlled using the command messages. For example, the lead vehicle 104 may or may not be disposed at the front end of the vehicle system 102 (e.g., along a direction of travel of the vehicle system 102). Additionally, the remote vehicles 106A-C need not be separated from the lead vehicle 104. For example, a remote vehicle 106A-C may be directly coupled with the lead vehicle 104 or may be separated from the lead vehicle 104 by one or more other remote vehicles 106A-C and/or non-propulsion-generating vehicles 108.

Figure 2:
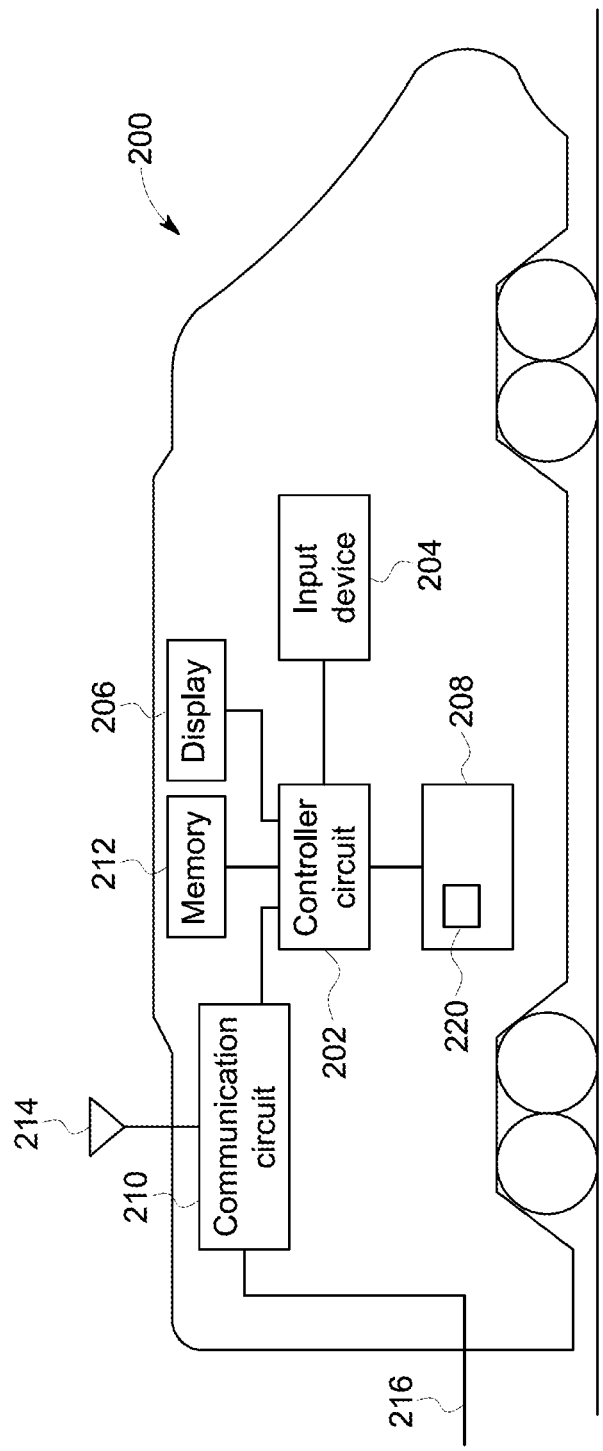
FIG. 2 illustrates a schematic diagram of a propulsion-generating vehicle, in accordance with an embodiment.

FIG. 2 is a schematic diagram of a propulsion-generating vehicle 200, in accordance with one embodiment. The vehicle 200 may represent one or more of the vehicles 104, 106 shown in FIG. 1. The vehicle 200 includes a controller circuit 202 that controls operations of the vehicle 200. The controller circuit 202 may include or represent one or more hardware circuits or circuitry that include, are connected with, or that both include and are connected with one or more processors, controllers, or other hardware logic-based devices.

The controller circuit 202 may be connected with a communication circuit 210. The communication circuit 210 may represents hardware and/or software that is used to communicate with other vehicles (e.g., the vehicles 104-108) within the vehicle system 102, dispatch stations, remote system, and/or the like. For example, the communication circuit 210 may include a transceiver and associated circuitry (e.g., antennas) 214 for wirelessly communicating (e.g., communicating and/or receiving) linking messages, command messages, linking confirmation messages, reply messages, retry messages, repeat messages, status messages, and/or the like. Optionally, the communication circuit 210 includes circuitry for communicating the messages over a wired connection 216, such as an electric multiple unit line of the vehicle system 102, catenary or third rail of electrically powered vehicle, or another conductive pathway between or among the propulsion-generating vehicles 104, 106 in the vehicle system 102.

The memory 212 may be may be used for storing firmware or software corresponding to, for example, a graphical user interface, programmed instructions for one or more components in the propulsion-generating vehicle 200 (e.g., the controller circuit 202, the propulsion subsystem 208), and/or the like. The memory 140 may be a tangible and non-transitory computer readable medium such as flash memory, RAM, ROM, EEPROM, and/or the like.

The controller circuit 202 is connected to an input device 204 and a display 206. The controller circuit 202 can receive manual input from an operator of the propulsion-generating vehicle 200 through the input device 204, such as a keyboard, touchscreen, electronic mouse, microphone, throttle and braking controls, and/or the like. For example, the controller circuit 202 can receive manually input changes to the tractive effort, braking effort, speed, power output, and the like, from the input device 204.

The display 206 may include one or more liquid crystal displays (e.g., light emitting diode (LED) backlight), organic light emitting diode (OLED) displays, plasma displays, CRT displays, and/or the like. For example, the controller circuit 202 can present the status and/or details of the vehicle system 102, identities and statuses of the remote vehicles 106, contents of one or more command messages, and/or the like. Optionally, the display 206 may be a touchscreen display, which includes at least a portion of the input device 204. For example, a portion of the input device 204 may interact with a graphical user interface (GUI) generated by the controller circuit 202, which is shown on the display 206.

The controller circuit 202 is connected with a propulsion subsystem 208. The propulsion subsystem 208 provides tractive effort and/or braking effort of the propulsion-generating vehicle 200. The controller circuit 202 can generate control signals autonomously or based on manual input that is used to direct operations of the propulsion subsystem 208. The propulsion subsystem 208 may include or represent one or more engines, motors, alternators, generators, brakes, batteries, turbines, and/or the like, that operate to propel the propulsion-generating vehicle 200 under the manual or autonomous control that is implemented by the controller circuit 202.

The propulsion subsystem 208 may include an electric drive system/subsystem 220. The electric drive subsystem 220 may drive traction motors of the propulsion subsystem 208. For example, the electric drive subsystem 200 may receive an input electrical power from a power source (e.g., alternating current from an energy storage and/or from an engine-driven alternator) and output electrical power, such as a DC signal, converted from the input electrical power to a load, such as the traction motors.

Figure 3:
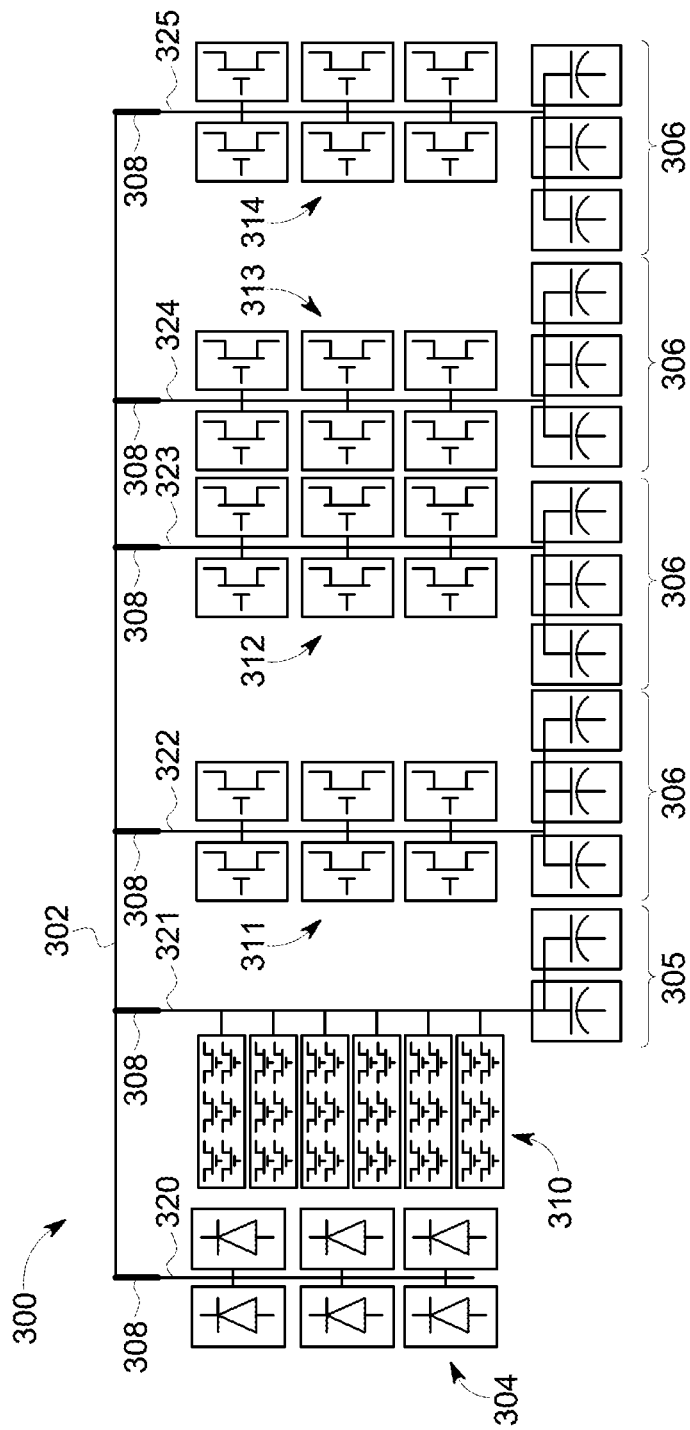
FIG. 3 is a schematic diagram of an electric drive subsystem, in accordance with an embodiment.

FIG. 3 is a schematic diagram of an electric drive subsystem 300, in accordance with an embodiment. The electric drive subsystem 300 includes a DC bus. The DC bus includes a bus assembly 302 and a series of arms (e.g., first through sixth arms 320, 321, 322, 323, 324, and 325, collectively, 320-325) extending from the bus assembly 302. The series of arms 320-325 are configured to be electrically parallel with respect to each other. For example, an electrical potential across the arms 320-325 may be similar to and/or the same with each other. In one aspect, each of the arms 320-325 may be a respective laminated bus bar, for example, one or more of the arms 320-325 may include a plurality of conductive layers (e.g., copper) separated by a dielectric material (e.g., insulator).

The arms 320-325 may be electrically coupled to the bus assembly 302 via bus links 308, and a set of capacitors 305-306 at distal end of each arm 320-325. The first arm 320 is electrically coupled to a set of diodes 304, and the other arms 321-325 are electrically coupled to sets of switches 310, 311, 312, 313, and -314, respectively. The sets of switches 310-314 may include insulated gate bipolar transistors (IGBTs), metal oxide semiconductor field effect transistors (MOSFETs), silicon carbide (SiC) MOSFETs, gallium nitride (GaN) devices, bipolar junction transistors (BJTs), metal oxide semiconductor controlled thyristors (MCTs), and/or the like. The diodes 304 and one or more of the sets of switches 310-314 form one or more inverters of the electric drive subsystem 300. For example, the diodes 304 and the set of switches 311 may form an inverter, and the diodes 304 and the set of switches 312 may form a second inverter. In one aspect, the sets of switches 310-314 may correspond to phase modules of the one or more inverters of the electric drive subsystem 300. It may be noted that each of the arms 310-314 of the bus assembly 302 includes at least one of sets of switches 310-314 or diodes 304. Optionally, the bus assembly 302 may not include an arm configured as a cable to only electrically couple the bus assembly 302 to one or more capacitors (e.g., sets of capacitors 305, 306).

Figure 4:
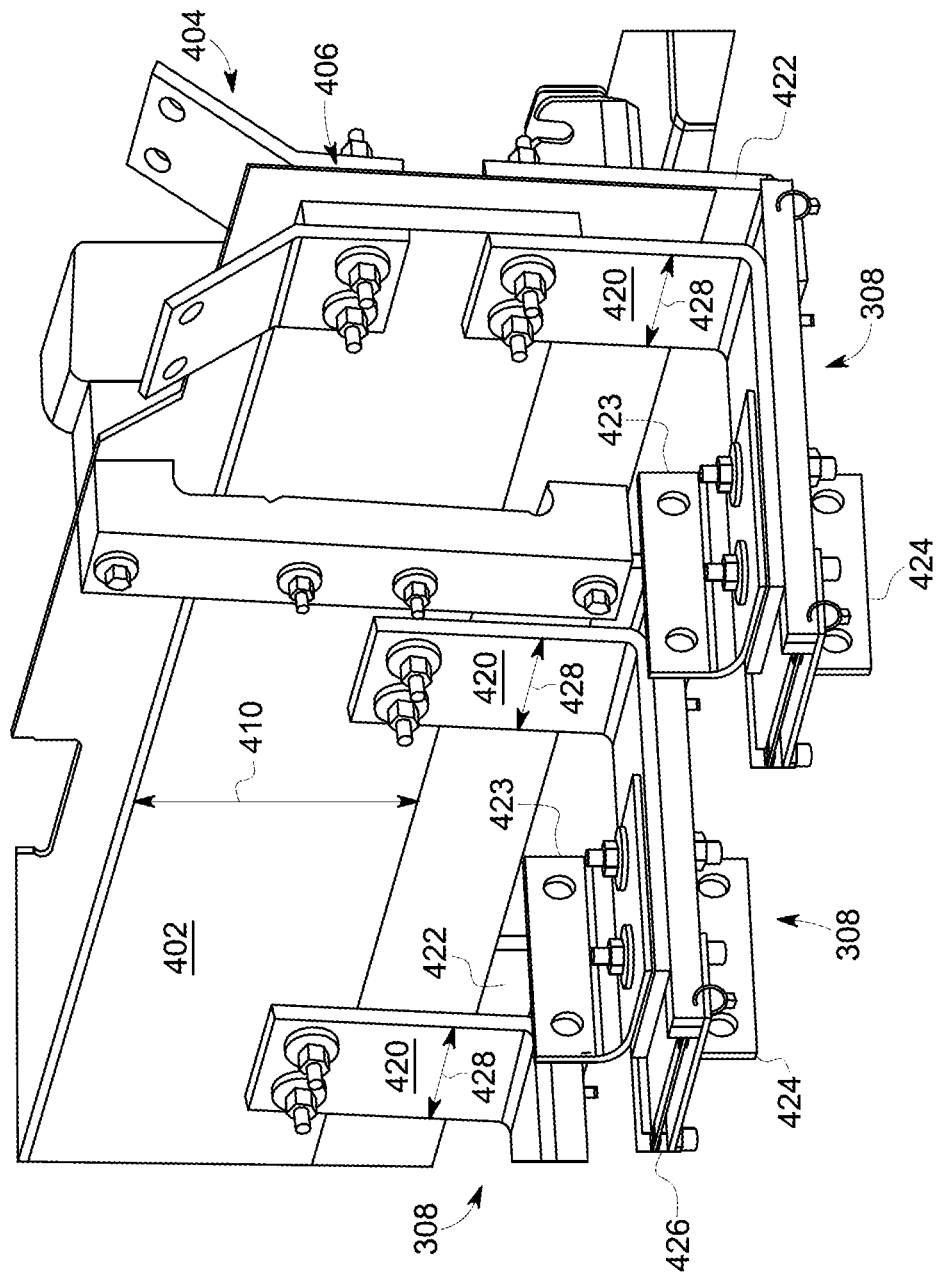
FIG. 4 is a peripheral view of a portion of a bus assembly of the electric drive subsystem shown in FIG. 3, in accordance with one embodiment.
Figure 5:
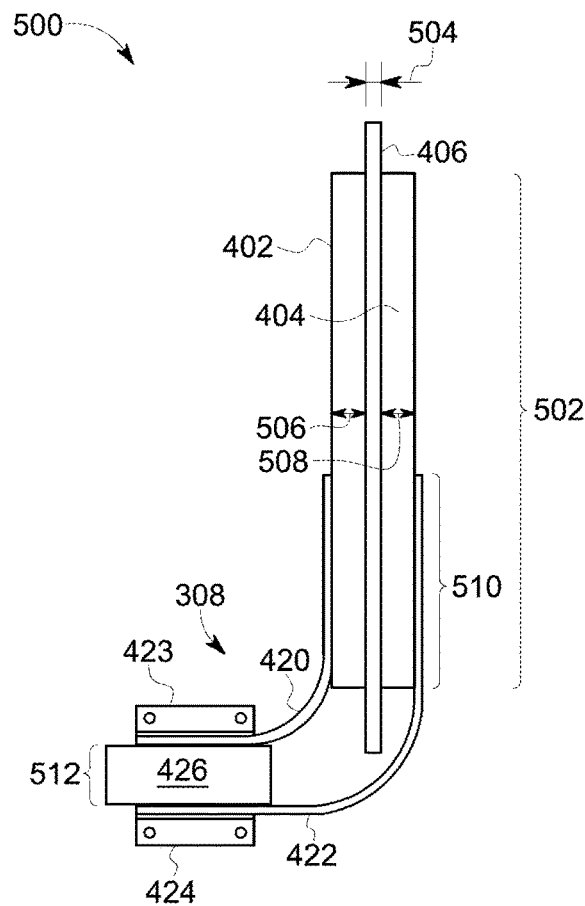
FIG. 5 is a cross section view of the portion of the bus assembly shown in FIG. 4, in accordance with one embodiment.

In connection with FIGS. 4 and 5 the bus assembly 302 may be configured to reduce stray inductances generated between the inverters and/or the between the bus assembly 302 and one or more of the arms 321-325.

FIG. 4 is a peripheral view of a portion of the bus assembly 302 of the electric drive subsystem 300. FIG. 5 is a cross section view 500 of the portion of the bus assembly 302 shown in FIG. 4. The bus assembly 302 includes conductive layers 402, 404 and an insulator sheet 406. The conductive layers 402, 404 and the insulator sheet 406 each may be configured or shaped to form planar surfaces.

The conductive layers 402, 404 may be an electrical conductor such as copper, aluminum, gold, and/or the like. The conductive layers 402, 404 may correspond to polarities of a DC voltage of the bus assembly 302. In one aspect, the conductive layer 402 may correspond to a positive polarity (DC+) of the DC voltage, and the conductive layer 404 may correspond to a ground (e.g., electrically common) or negative polarity (DC−) of the DC voltage.

The insulator sheet 406 may be positioned to electrically isolate the conductive layers 402, 404. For example, the insulator sheet 406 is shown in FIGS. 4-5 positioned between and/or interposed between the conductive layers 402, 404. The insulator sheet 406 may include a glastic material, ceramic, and/or the like. In one aspect, the insulator sheet 406 reduces the stray inductances of the integrated electric drive subsystem 220. In operation, the insulator sheet 406 forms a gap or distance 504 between the conductive layers 402, 404, which affects the stray inductance. For example, the stray inductance is reduced when the distance 504 between the conductive layers 402, 404 is smaller relative to larger distances 504. A size of the gap or distance 504 may be based on a thickness of the insulator sheet 406. Additionally, adjusting a thickness of the insulator sheet 406 allows various embodiments to have a smaller distance 504, such as no more than half an inch, or less than half an inch (e.g., 0.25 inches, 0.3 inches, and/or the like), relative to a distance between conductive layers in a conventional electric drive subsystem, which is separated by an air gap (e.g., such as 1.25 inches).

The conductive layers 402, 404 are at least partially aligned with respect to each other to form an overlap region 502 (shown in FIG. 5). The overlap region 502 may correspond to a portion and/or subset of the insulator sheet 406 directly adjacent to each of the conductive layers 402, 404. In operation, a size of the overlap region 502 of the conductive layers 402, 404 affects the stray inductances. For example, the stray inductance is reduced for larger overlap regions 502 relative to smaller overlap regions 502. In one aspect, the bus assembly 302 may be configured to have a height 410 of the conductive layers 402, 404 of 6 inches and a thickness 506, 508 of 0.5 inches to increase the overlap region 502 to have a smaller stray inductance relative to conductive layers 402, 404 having a height 410 of 4 inches and a thickness 506, 508 of 0.75 inches (for example).

The bus links 308 (shown in FIGS. 3-5) may include two (first and second) coupling connectors 420, 422 (e.g., first and second brackets) and a spacer 426. In one aspect, the two coupling connectors 420, 422 may have a width 428 of approximately 3 inches within a predetermined threshold. It may be noted in at least one embodiment the width 428 may be greater than 3 inches or less than 3 inches. The two coupling connectors 420, 422 create an electrical connection from one of the conductive layers 402, 404 to a corresponding arm 320-325. For example, the first coupling connector 420 is electrically coupled to the first conductive layer 402 and the second coupling connector 422 is electrically coupled to the second conductive layer 404. The coupling connectors 420, 422 may include a conductive material such as copper, aluminum, gold, and/or the like. As shown in FIGS. 4-5, the coupling connector 420 may be fastened (e.g., using pins, clips, clamps, bolts, screws, and/or the like) and/or welded to the conductive layer 402, and the coupling connector 422 may be fastened and/or welded to the conductive layer 404.

In embodiments, the two coupling connectors 420, 422 are aligned with each other. For example, edges of the first coupling connector 420 are aligned with the edges of the second coupling connector 422. Additionally or alternatively, a portion of the two coupling connectors 420, 422 may form a second overlap region 510. The second overlap region 510 may correspond to a portion and/or subset of the insulator sheet 406 interposed between the two coupling connectors 420, 422 and the two conducive layers 402, 404. Additionally, the second overlap region 510 may be defined by a portion of the conductive layers 402 and 404 directly adjacent to the two coupling connectors 420 and 422, respectively. In operation, the second overlap region 510 formed by the two coupling connectors 420, 422 affects the stray inductances. For example, the stray inductance is reduced when the two coupling connectors 420 and 422 are aligned to form the second overlap region 510 relative to if the two coupling connectors 420 and 422 were not aligned with each other (e.g., no second overlap region 510).

It may be noted that the two coupling connectors 420, 422 are continually separated, both electrically and physically from each other. For example, a spacer 426 is positioned at the distal end (e.g., relative to the conductive layers 402, 404) of each coupling connector 420, 422. The spacer 426 may be an insulator to electrically and/or physically isolate at least a portion of the coupling connectors 420, 422 from each other.

In operation, a distance 512 formed by the spacer 426 between the coupling connectors 420, 422 may affect the stray inductances. For example, the stray inductance is reduced for smaller distances 512 relative to larger distances 512. Optionally, bus link 308 may be configured such that at least a portion of the coupling connector 420 is positioned at the distance 512 from the coupling connector 422 based on a predetermined stray inductance. In one aspect, the bus link 308 may be configured to include the spacer 426 forming the distance 512 between the coupling connectors 420-422 of 0.25 inches to have a smaller stray inductance relative to a distance of coupling connectors of 1.25 inches (for example). For example, the spacer 426 may be configured to separate the coupling connector 420 from the coupling connector 422 at a distance 512 based on a predetermined or designated stray inductance.

The two coupling connectors 420, 422 may extend orthogonally with respect to the insulator sheet 406. For example, a distal end of the two coupling connectors 420, 422 may extend along a normal plane with respect to the insulator sheet 406 and the conductive layers 402, 404. At the distal end (e.g., relative to the conductive layers 402, 404) of each coupling connector 420, 422 is an end plate 423, 424, respectively. The end plate 423, 424 may be configured to connect physically and electrically the coupling connector 420, 422 to a corresponding arm 320-325. For example, the end plate 423 may include pre-formed apertures to allow the end plate 423 to be fastened (e.g., using pins, clips, clamps, bolts, screws, and/or the like) to a portion of one of the arms 320-325. (As noted above, each of the arms 320-325 may include a respective laminated bus bar to which plural transistors or other electric switches are operably electrically coupled. Examples of such bus bars are shown in U.S. Pat. No. D743898 issued Nov. 24, 2015, U.S. Pat. No. D742328 issued Nov. 3, 2015, and U.S. Pat. No. D743902 issued Nov. 24, 2015.)

Figure 6:
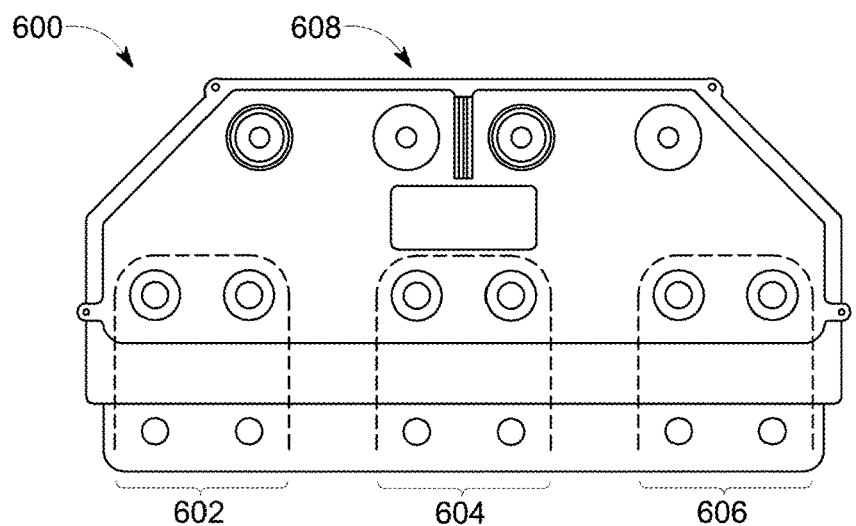
FIG. 6 is a peripheral view of a capacitor bus bar, in accordance with one embodiment.

Returning to FIG. 3, each set of capacitors 306 may be positioned on a corresponding capacitor bus bar 600 (shown in FIG. 6). The capacitor bus bar 600 may correspond to a horizontal bus bar configured to electrically and physically connect each set of capacitors 306 to one of the arms 322-325. For example, the capacitor bus bar 600 may couple the one of the set of capacitors 306 to the arm 322, and an alternative set of capacitors 306 to the arm 323.

FIG. 6 is perspective view of the capacitor bus bar 600, in accordance with one embodiment. The capacitor bus bar 600 is shown as a single unitary body having three sets of capacitor apertures 602, 604, 606 and a set of arm apertures 608. The arm apertures 608 may be configured to physically and electrical couple one of the arms 322-325 (shown in FIG. 3) to the capacitor bus bar 600. For example, the arm apertures 608 may be configured to allow one of the arms 322-325 to be fastened (e.g., using pins, clips, clamps, bolts, screws, and/or the like) to the capacitor bus bar 600. Additionally, each set of the capacitor apertures 602, 604, 606 may physically and electrically couple a capacitor to the capacitor bus bar 600. For example, the at least three capacitors may be mounted or physically and electrically coupled to the capacitor bus bar 600. Thereby, the capacitor apertures 602, 604, 606 may allow the three capacitors forming a set of the capacitors 306 to be fastened to the capacitor bus bar 600 and electrically coupled to one of the arms 322-325 having a corresponding set of switches 310-314 (e.g., phase modules). For example, each of the capacitor apertures 602, 604, 606 may be fastened (e.g., using pins, clips, clamps, bolts, screws, and/or the like) to one of the capacitors of the capacitor set 306.

It may be noted that the three capacitors coupled to the capacitor bus bar 600 may improve short circuit detection of the one or more inverters of the electric drive subsystem 300 (shown in FIG. 3). For example, the capacitor bus bar 600 enables the electric drive subsystem 300 to detect a short circuit of the one or more inverters faster or prior to a conventional system using parallel cables. Conventional systems include electrically parallel cables (e.g., the cables have similar and/or the same electrical potential as the arms 322-325) coupling the bus assembly to additional capacitors. In conventional systems, the cables electrically couple a bus assembly to a pair of capacitors, and are not electrically coupled to sets of switches (e.g., the set of switches 311-314). The capacitor bus bar 600 enables embodiments without the cable. Additionally, the capacitor bus bar 600 is configured to increase the current distribution between the sets of capacitors 306. In operation, the capacitor bus bar 600 may be configured to reduce an amount of current delivered to each capacitor electrically coupled to the arms 322-325 relative to a capacitor bus bar having less than three capacitors. Additionally, the arm 322 electrically coupled to the three capacitors (e.g., one of the sets of capacitors 306) may have a reduced stray inductance, and/or a higher resonance frequency (e.g., ranging from 3-4.5 kilohertz) and damping factor relative to an arm electrically coupled to two of the capacitors with the parallel cable. For example, an increased damping factor may reduce DC link ripple voltage.

Figure 7:
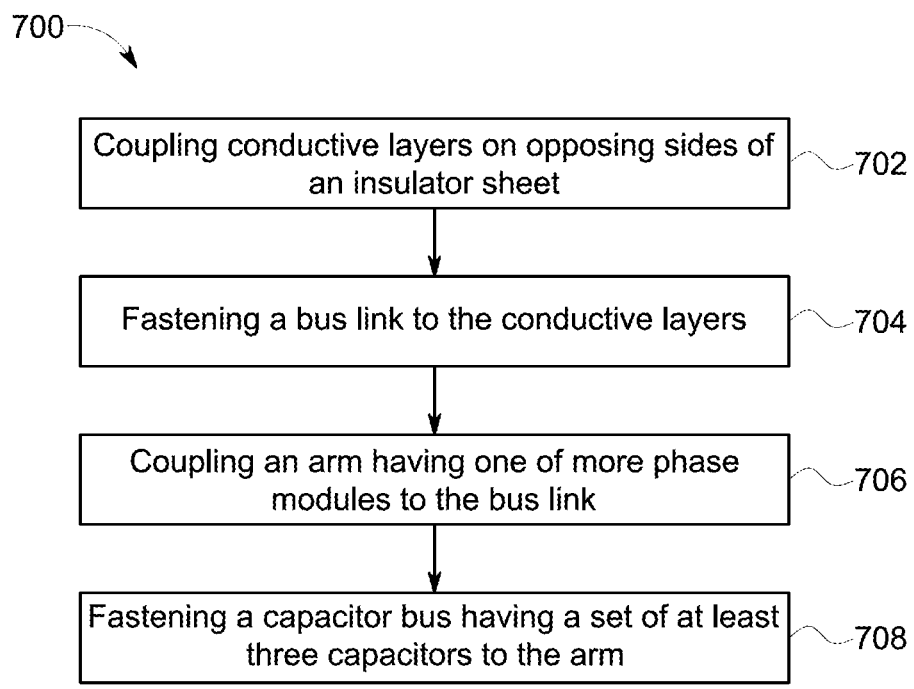
FIG. 7 is a flowchart of an embodiment of a method for forming a bus assembly.

FIG. 7 is a flow chart of a method 700 for forming a bus assembly, in accordance with an embodiment. Beginning at 702, conductive layers are coupled to opposing sides of an insulator sheet. The conductive layers may be approximately the same as and/or identical to the conductive layers. The conductive layers may carry a DC signal that may be associated with the propulsion subsystem 208 (e.g., traction motor control) of the propulsion-generating vehicle 200. The conductive layers may include copper, aluminum, gold, and/or the like. Each of the conductive layers may correspond to a polarity of the DC signal. For example, a first conductive layer may carry a positive polarity of the DC signal (e.g., DC+), and a second conductive layer may carry a ground and/or negative polarity of the DC signal (e.g., DC−).

The insulator sheet may be a non-conductive material, such as glastic. The insulator sheet may be positioned to electrically separate the conductive layers. For example, each conductive layer may be coupled to opposing sides of the insulator sheet positioning the insulator sheet between the conductive layers. In one aspect, the conductive layers may be aligned with respect to each other forming an overlap region. The overlap region may correspond to a portion and/or subset of the insulator sheet directly adjacent to each of the conductive layers.

At 704, a bus link is fastened to the conductive layers. The bus link may be approximately the same as and/or identical to the bus link 308. The bus link may include a conductive material such as copper, aluminum, gold, and/or the like. Additionally, the bus link may include two brackets. Each bracket may be fastened (e.g., using pins, clips, clamps, bolts, screws, and/or the like) and/or welded to a corresponding conductive layer. For example, a first bracket may be fastened to the first conductive layer, and a second bracket may be fastened to the second conductive layer. In one aspect the brackets may be approximately the same as and/or identical to the coupling connectors 420, 422. Each bracket may be electrically and physically isolated from each other. For example, the first bracket may not be touching the second bracket. In one aspect, each of the brackets may be aligned with each other positioned within the overlap region of the conductive layers. For example, the edges of the first bracket may align with the edges of the second bracket.

At 706, an arm having one or more phase modules is coupled to the bus link. The arm may be approximately the same as and/or identical to one of the arms 322-325. The one or more phase modules may correspond to a set of switches (e.g., the set of switches 310-314) that are electrically coupled to the arm. In one aspect the arm may be a laminated bus bar, for example, the arm may include a plurality of conductive layers (e.g., copper) separated by a dielectric material. The arm may be connected to the bus link, which electrically couples the arm to the conductive layers. For example, the arm may be fastened to the bus link using pins, clips, clamps, bolts, screws, and/or the like.

At 708, a capacitor bus having a set of at least three capacitors is fastened to the arm. For example, the capacitor bus may be fastened (e.g., using pins, clips, clamps, bolts, screws, and/or the like) to a distal end of the arm with respect to the bus link. The capacitor bus may be configured to electrically couple the set of at least three capacitors to the arm and thereby the phase modules and conductive layers.

In an embodiment, a bus assembly includes a bus bar having first and second conductive layers extending along an insulator sheet interposed between the first and second conductive layers. The first and second conductive layers are at least partially aligned with respect to each other to form a first overlap region of the insulator sheet. The bus assembly includes a plurality of arms. A first set of the arms include a set of diodes and a second set of the arms include a set of switches. The bus assembly further includes a plurality of bus links that couple the plurality of arms to the bus bar forming a plurality of inverters. Each of the plurality of bus links include a respective first bracket and a respective second bracket aligned with each other to form a second overlap region of the insulator sheet. The first bracket is electrically coupled to the first conductive layer and the second bracket is electrically coupled to the second conductive layer. The second overlap region is within the first overlap region.

Optionally, a distal end of the plurality of bus links extends orthogonally with respect to the insulator sheet.

Optionally, at least a portion of the first and second brackets are separated by a spacer configured to separate the first bracket from the second bracket based on a predetermined stray inductance. Additionally or alternatively, the spacer is configured to separate the first and second brackets at a distance of at least 0.25 inches.

Optionally, the first and second brackets have a width of three inches.

Optionally, the insulator sheet forms a gap between the first and second conductive layers, the gap being no more than a half inch.

Optionally, the pair of conductive layers have a height of six inches.

Optionally, the bus bar includes a plurality of capacitor buses each having a respective single unitary body configured to electrically couple at least three capacitors to each arm of the second set of arms. Additionally or alternatively, the bus assembly is operably coupled as part of an electric drive subsystem, and the at least three capacitors adjust a resonance frequency of the electric drive subsystem. The resonance frequency may range from three to four and a half kilohertz. Additionally or alternatively, the capacitor buses are configured to reduce ripple voltage of the bus bar relative to a bus bar having a parallel cable.

Optionally, the bus bar carries a direct current signal associated with controlling a traction motor of a propulsion-generating vehicle.

Optionally, the first conductive layer corresponds to a positive polarity of a DC voltage and the second conductive layer corresponds to a negative or ground polarity of the DC voltage.

In an embodiment, a bus assembly includes a bus bar having first and second conductive layers extending along an insulator sheet interposed between the first and second conductive layers. The first and second conductive layers are at least partially aligned with respect to each other to form a first overlap region of the insulator sheet. The bus assembly includes a set of diodes electrically coupled to the first and second conductive layers, plural sets of switches electrically coupled to the first and second conductive layers in parallel to the set of diodes, and plural sets of capacitors coupled to the sets of switches. Each set of the sets of capacitors respectively includes at least three capacitors mounted on a single unitary body.

Optionally, the bus bar includes a plurality of bus links that are configured to electrically couple the set of diodes and the sets of switches to the bus bar. Each of the plurality of bus links may include a first and second bracket aligned with each other to form a second overlap region of the insulator sheet. The first bracket may be fastened to the first conductive layer and the second bracket may be fastened to the second conductive layer. The second overlap region may be within the first overlap region. Additionally or alternatively, a distal end of each of the plurality of bus links extends orthogonally with respect to the insulator sheet. Each distal end may be electrically coupled to the set of diodes or one set of the set of switches. Additionally or alternatively, each of the plurality of bus links are configured to have at least a portion of the first bracket positioned a distance from the second bracket based on a predetermined stray inductance. Additionally or alternatively, the distance may be at least 0.25 inches.

Optionally, the bus bar carries a direct current signal associated with controlling a traction motor of a propulsion-generating vehicle.

In an embodiment, a method (e.g., for forming a bus of an electric drive subsystem) is provided. The method includes coupling a first conductive layer and a second conductive layer to opposing sides of an insulator sheet. The first and second conductive layers are at least partially aligned with respect to each other relative to the insulator sheet to form a first overlap region of the insulator sheet. The method further includes fastening a first bracket of a bus link to the first conductive layer and a second bracket of the bus link to the second conductive layer. The first bracket and the second bracket are aligned with each other to form a second overlap region of the insulator sheet. The second overlap region is within the first overlap region. The method further includes electrically coupling a phase module and a capacitor bus to the bus link, wherein the capacitor bus has a single unitary body and includes at least three capacitors.

Optionally, the at least three capacitors are configured to adjust a resonance frequency of the electric drive subsystem to a range of three to four and a half kilohertz.

In an embodiment, a system (e.g., a vehicle drive system) includes a DC electrical power source having first and second polarities, a controller, at least one traction motor; and a bus assembly. The bus assembly includes a DC link bus bar having first and second conductive layers extending along an insulator sheet interposed between the first and second conductive layers. The first and second conductive layers are at least partially aligned with respect to each other to form a first overlap region of the insulator sheet, and the first and second conductor layers are respectively electrically coupled to the first and second polarities of the DC electrical power source. The bus assembly includes a plurality of arms. The arms include laminated bus bars, plural diodes electrically connected to one or more of the laminated bus bars, and one or more sets of switches electrically connected to one or more of the laminated bus bars. The bus assembly further includes a plurality of bus links that couple the plurality of arms to the DC link bus bar forming a plurality of inverters. Each of the plurality of bus links include a respective first bracket and a respective second bracket aligned with each other to form a second overlap region of the insulator sheet. The first bracket is electrically coupled to the first conductive layer and the second bracket is electrically coupled to the second conductive layer. The second overlap region is within the first overlap region. The controller is configured to control the switches for the inverters to electrically power the at least one traction motor for movement of the vehicle along a route.

In another embodiment, the first and second brackets are angled, with each of the first and second brackets comprising a respective first portion parallel to the DC link bus bar and a respective second portion perpendicular to the DC link bus bar, and wherein the laminated bus bars are attached to the second portions of the first and second brackets and are perpendicular to the DC link bus bar.

As used herein, the terms "module", "system," "device," or "unit," may include a hardware and/or software system and circuitry that operates to perform one or more functions. For example, a module, unit, device, or system may include a computer processor, controller, or other logic-based device that performs operations based on instructions stored on a tangible and non-transitory computer readable storage medium, such as a computer memory. Alternatively, a module, unit, device, or system may include a hard-wired device that performs operations based on hard-wired logic and circuitry of the device. The modules, units, or systems shown in the attached figures may represent the hardware and circuitry that operates based on software or hardwired instructions, the software that directs hardware to perform the operations, or a combination thereof. The modules, systems, devices, or units can include or represent hardware circuits or circuitry that include and/or are connected with one or more processors, such as one or computer microprocessors.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the inventive subject matter, including the best mode, and also to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, or the like). Similarly, the programs may be stand alone programs, may be incorporated as subroutines in an operating system, may be functions in an installed software package, or the like. The various embodiments are not limited to the arrangements and instrumentality shown in the drawings.

As used herein, an element or step recited in the singular and proceeded with the word "a" or "an" should be understood as not excluding plural of said elements or operations, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "comprises," "including," "includes," "having," or "has" an element or a plurality of elements having a particular property may include additional such elements not having that property.

The invention claimed is:

1. A bus assembly comprising:
    a bus bar having first and second conductive layers extending along an insulator sheet interposed between the first and second conductive layers, wherein the first and second conductive layers are at least partially aligned with respect to each other to form a first overlap region of the insulator sheet;
    a plurality of arms, wherein a first set of the arms include a set of diodes and a second set of the arms include a set of switches; and
    a plurality of bus links that couple the plurality of arms to the bus bar forming a plurality of inverters, wherein each of the plurality of bus links include a respective first bracket and a respective second bracket aligned with each other to form a second overlap region of the insulator sheet, the first bracket electrically coupled to the first conductive layer and the second bracket electrically coupled to the second conductive layer, wherein the second overlap region is within the first overlap region.

2. The bus assembly of claim 1, wherein a distal end of the plurality of bus links extends orthogonally with respect to the insulator sheet.

3. The bus assembly of claim 1, wherein at least a portion of the first and second brackets are separated by a spacer configured to separate the first bracket from the second bracket based on a predetermined stray inductance.

4. The bus assembly of claim 3, wherein the spacer is configured to separate the first and second brackets at a distance of at least 0.25 inches.

5. The bus assembly of claim 1, wherein the first and second brackets have a width of three inches.

6. The bus assembly of claim 1, wherein the insulator sheet forms a gap between the first and second conductive layers, the gap being no more than a half inch.

7. The bus assembly of claim 1, wherein the pair of conductive layers have a height of six inches.

8. The bus assembly of claim 1, further comprising a plurality of capacitor buses each having a respective single unitary body configured to electrically couple at least three capacitors to each arm of the second set of arms.

9. The bus assembly of claim 8, wherein the bus assembly is operably coupled as part of an electric drive subsystem, and the at least three capacitors adjust a resonance frequency of the electric drive subsystem, the resonance frequency ranging from three to four and a half kilohertz.

10. The bus assembly of claim 8, wherein the capacitor buses are configured to reduce ripple voltage of the bus bar relative to a bus bar having a parallel cable.

11. The bus assembly of claim 1, wherein the bus bar carries a direct current signal associated with controlling a traction motor of a propulsion-generating vehicle.

12. The bus assembly of claim 1, wherein the first conductive layer corresponds to a positive polarity of a DC voltage and the second conductive layer corresponds to a negative or ground polarity of the DC voltage.

13. A bus assembly comprising:
    a bus bar having first and second conductive layers extending along an insulator sheet interposed between the first and second conductive layers, wherein the first and second conductive layers are at least partially aligned with respect to each other to form a first overlap region of the insulator sheet;

a set of diodes electrically coupled to the first and second conductive layers;

plural sets of switches electrically coupled to the first and second conductive layers in parallel to the set of diodes; and plural sets of capacitors coupled to the sets of switches, wherein each set of the sets of capacitors respectively includes at least three capacitors mounted on a single unitary body.

14. The bus assembly of claim 13, further comprising a plurality of bus links that are configured to electrically couple the set of diodes and the sets of switches to the bus bar, wherein each of the plurality of bus links include a first and second bracket aligned with each other to form a second overlap region of the insulator sheet, the first bracket fastened to the first conductive layer and the second bracket fastened to the second conductive layer, wherein the second overlap region is within the first overlap region.

15. The bus assembly of claim 14, wherein a distal end of each of the plurality of bus links extends orthogonally with respect to the insulator sheet, each distal end is electrically coupled to the set of diodes or one set of the set of switches.

16. The bus assembly of claim 14, wherein each of the plurality of bus links are configured to have at least a portion of the first bracket positioned a distance from the second bracket based on a predetermined stray inductance.

17. The bus assembly of claim 16, wherein the distance is at least 0.25 inches.

18. The bus assembly of claim 13, wherein the bus bar carries a direct current signal associated with controlling a traction motor of a propulsion-generating vehicle.

19. A method of forming a bus of an electric drive subsystem, comprising:

coupling a first conductive layer and a second conductive layer to opposing sides of an insulator sheet, wherein the first and second conductive layers are at least partially aligned with respect to each other relative to the insulator sheet to form a first overlap region of the insulator sheet;

fastening a first bracket of a bus link to the first conductive layer and a second bracket of the bus link to the second conductive layer, wherein the first bracket and the second bracket are aligned with each other to form a second overlap region of the insulator sheet, the second overlap region is within the first overlap region; and electrically coupling a phase module and a capacitor bus to the bus link, wherein the capacitor bus has a single unitary body and includes at least three capacitors.

20. The method of claim 19, wherein the at least three capacitors are configured to adjust a resonance frequency of the electric drive subsystem to a range of three to four and a half kilohertz.

21. A vehicle electric drive system comprising:

a DC electrical power source having first and second polarities;

a controller;

at least one traction motor; and a bus assembly comprising:

a DC link bus bar having first and second conductive layers extending along an insulator sheet interposed between the first and second conductive layers, wherein the first and second conductive layers are at least partially aligned with respect to each other to form a first overlap region of the insulator sheet, and wherein the first and second conductor layers are respectively electrically coupled to the first and second polarities of the DC electrical power source;

a plurality of arms, the arms comprising laminated bus bars, plural diodes electrically connected to one or more of the laminated bus bars, and one or more sets of switches electrically connected to one or more of the laminated bus bars; and a plurality of bus links that couple the plurality of arms to the DC link bus bar forming a plurality of inverters, wherein each of the plurality of bus links include a respective first bracket and a respective second bracket aligned with each other to form a second overlap region of the insulator sheet, the first bracket electrically coupled to the first conductive layer and the second bracket electrically coupled to the second conductive layer, wherein the second overlap region is within the first overlap region;

wherein the controller is configured to control the switches for the inverters to electrically power the at least one traction motor for movement of the vehicle along a route.

22. The system of claim 21, wherein the first and second brackets are angled, with each of the first and second brackets comprising a respective first portion parallel to the DC link bus bar and a respective second portion perpendicular to the DC link bus bar, and wherein the laminated bus bars are attached to the second portions of the first and second brackets and are perpendicular to the DC link bus bar.

* * * * *